US011295504B1

(12) United States Patent
Allen, Jr. et al.

(10) Patent No.: US 11,295,504 B1
(45) Date of Patent: Apr. 5, 2022

(54) SYSTEMS AND METHODS FOR DYNAMIC DIGITAL ANIMATION

(71) Applicant: Meta Platforms, Inc., Menlo Park, CA (US)

(72) Inventors: Robert Alexander Allen, Jr., Oakland, CA (US); Michael O'Brien, Oakland, CA (US); Nicholas J. Kwiatek, New York, NY (US); Alexander Zats, New York, NY (US); Jerod Wanner, Oakland, CA (US); Emily Dubinsky Gasca, New York, NY (US); Eduardo de Mello Maia, San Francisco, CA (US); Christopher Slowik, Union City, CA (US); Renyu Liu, Sunnyvale, CA (US); Rajesh Janakiraman, Sunnyvale, CA (US); David Graham McDermott, Berkeley, CA (US)

(73) Assignee: Meta Platforms, Inc., Meno Park, CA (US)

( * ) Notice: Subject to any disclaimer, the term of this patent is extended or adjusted under 35 U.S.C. 154(b) by 0 days.

(21) Appl. No.: 16/529,434

(22) Filed: Aug. 1, 2019

(51) Int. Cl.
*G06T 13/80* (2011.01)
*G06Q 50/00* (2012.01)
*G06T 11/60* (2006.01)

(52) U.S. Cl.
CPC .............. *G06T 13/80* (2013.01); *G06Q 50/01* (2013.01); *G06T 11/60* (2013.01)

(58) Field of Classification Search
CPC .......... G06T 13/80; G06T 11/60; G06Q 50/01

USPC ......................................................... 345/473
See application file for complete search history.

(56) References Cited

U.S. PATENT DOCUMENTS

| 2004/0222992 | A1* | 11/2004 | Calkins | .................. G06T 13/00 345/473 |
| 2013/0124952 | A1* | 5/2013 | Frem | ..................... G06F 40/194 715/202 |
| 2014/0274373 | A1* | 9/2014 | Olshan | .................. A63F 13/825 463/31 |
| 2015/0234564 | A1* | 8/2015 | Snibbe | ................. G11B 27/031 715/716 |
| 2015/0331842 | A1* | 11/2015 | Costa | ..................... H04L 67/22 715/202 |
| 2019/0080486 | A1* | 3/2019 | Randall | ............... G06F 3/04817 |
| 2019/0132642 | A1* | 5/2019 | Wang | ............... H04N 21/44012 |

* cited by examiner

*Primary Examiner* — Hai Tao Sun
(74) *Attorney, Agent, or Firm* — Sheppard Mullin Richter & Hampton LLP

(57) ABSTRACT

Systems, methods, and non-transitory computer-readable media can receive render instructions for rendering an animation. The animation comprises a plurality of layers, each layer comprising one or more layer properties, and a first dynamic property to be defined at runtime prior to rendering the animation. The first dynamic property is mapped to a first set of layer properties of the one or more layer properties. A first dynamic property value is received for the first dynamic property. The first set of layer properties are defined based on the first dynamic property value. The animation is rendered on a computing device based on the render instructions and the first dynamic property value.

19 Claims, 12 Drawing Sheets

500

```
┌─────────────────────────────────────────────────────────────────────┐
│ Receive animation information associated with an animation to be    │
│ rendered on a computing device, wherein the animation comprises a   │
│ plurality of layers and each layer comprises one or more layer      │
│ properties                                                          │
│ 502                                                                 │
└─────────────────────────────────────────────────────────────────────┘
                                    │
                                    ▼
┌─────────────────────────────────────────────────────────────────────┐
│ Receive a first dynamic property, wherein the first dynamic         │
│ property is configured to be defined at runtime prior to rendering  │
│ of the animation                                                    │
│ 504                                                                 │
└─────────────────────────────────────────────────────────────────────┘
                                    │
                                    ▼
┌─────────────────────────────────────────────────────────────────────┐
│ Map a first set of layer properties of the one or more layer        │
│ properties to the first dynamic property                            │
│ 506                                                                 │
└─────────────────────────────────────────────────────────────────────┘
                                    │
                                    ▼
┌─────────────────────────────────────────────────────────────────────┐
│ Generate render instructions for rendering the animation based on   │
│ the animation information, the first dynamic property, and the      │
│ mapping the first set of layer properties to the first dynamic      │
│ property                                                            │
│ 508                                                                 │
└─────────────────────────────────────────────────────────────────────┘
```

```
┌─────────────────────────────────────────────────────────────────────┐
│ Receive render instructions for rendering an animation, wherein the │
│ animation comprises: a plurality of layers, each layer comprising   │
│ one or more layer properties, and a first dynamic property to be    │
│ defined at runtime prior to rendering the animation, wherein the    │
│ first dynamic property is mapped to a first set of layer properties │
│ of the one or more layer properties                                 │
│                              522                                    │
└─────────────────────────────────────────────────────────────────────┘
                                  ↓
┌─────────────────────────────────────────────────────────────────────┐
│     Receive a first dynamic property value for the first dynamic    │
│                             property                                │
│                               524                                   │
└─────────────────────────────────────────────────────────────────────┘
                                  ↓
┌─────────────────────────────────────────────────────────────────────┐
│   Define the first set of layer properties based on the first       │
│                     dynamic property value                          │
│                              526                                    │
└─────────────────────────────────────────────────────────────────────┘
                                  ↓
┌─────────────────────────────────────────────────────────────────────┐
│ Render the animation on a computing device based on the render      │
│          instructions and the first dynamic property value          │
│                              528                                    │
└─────────────────────────────────────────────────────────────────────┘
```

FIGURE 5B

SYSTEMS AND METHODS FOR DYNAMIC DIGITAL ANIMATION

FIELD OF THE INVENTION

The present technology relates to digital animation. More particularly, the present technology relates to systems and methods for dynamically modifying digital animations at runtime.

BACKGROUND

Today, people often utilize computing devices (or systems) for a wide variety of purposes. Users can use their computing devices to, for example, interact with one another, access content, share content, and create content. In some cases, content items can include postings from members of a social networking system. Content items may include media content items, such as images or videos. Content items may be published to the social networking system or any other content platform for consumption by others. In certain instances, users may utilize computing applications on their computing devices to carry out such tasks.

SUMMARY

Various embodiments of the present technology can include systems, methods, and non-transitory computer readable media configured to receive render instructions for rendering an animation. The animation comprises a plurality of layers, each layer comprising one or more layer properties, and a first dynamic property to be defined at runtime prior to rendering the animation. The first dynamic property is mapped to a first set of layer properties of the one or more layer properties. A first dynamic property value is received for the first dynamic property. The first set of layer properties are defined based on the first dynamic property value. The animation is rendered on a computing device based on the render instructions and the first dynamic property value.

In an embodiment, receiving the first dynamic property value comprises retrieving social network information associated with a first user, and determining the first dynamic property value based on the social network information.

In an embodiment, the first dynamic property is a dynamic color property, and the determining the first dynamic property value comprises determining a first color value based on the social network information.

In an embodiment, the first dynamic property is an image property, and the determining the first dynamic property value comprises determining an image value based on the social networking information.

In an embodiment, the image value defines an image to be used in the animation.

In an embodiment, receiving the first dynamic property value comprises randomly determining the first dynamic property value.

In an embodiment, the animation further comprises a first dynamic composition, and further wherein the first dynamic composition is associated with a plurality of interchangeable compositions.

In an embodiment, each composition of the plurality of interchangeable compositions comprises a plurality of layers, and each layer of the plurality of layers comprises one or more layer properties defining the layer.

In an embodiment, a first composition of the plurality of interchangeable compositions is identified. Rendering the animation on the computing device is performed further based on identifying the first composition.

In an embodiment, identifying the first composition of the plurality of interchangeable compositions comprises randomly selecting a first composition of the plurality of interchangeable compositions.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5A illustrates an example method, according to an embodiment of the present technology.

FIG. 5B illustrates an example method, according to an embodiment of the present technology.

Figure 1:
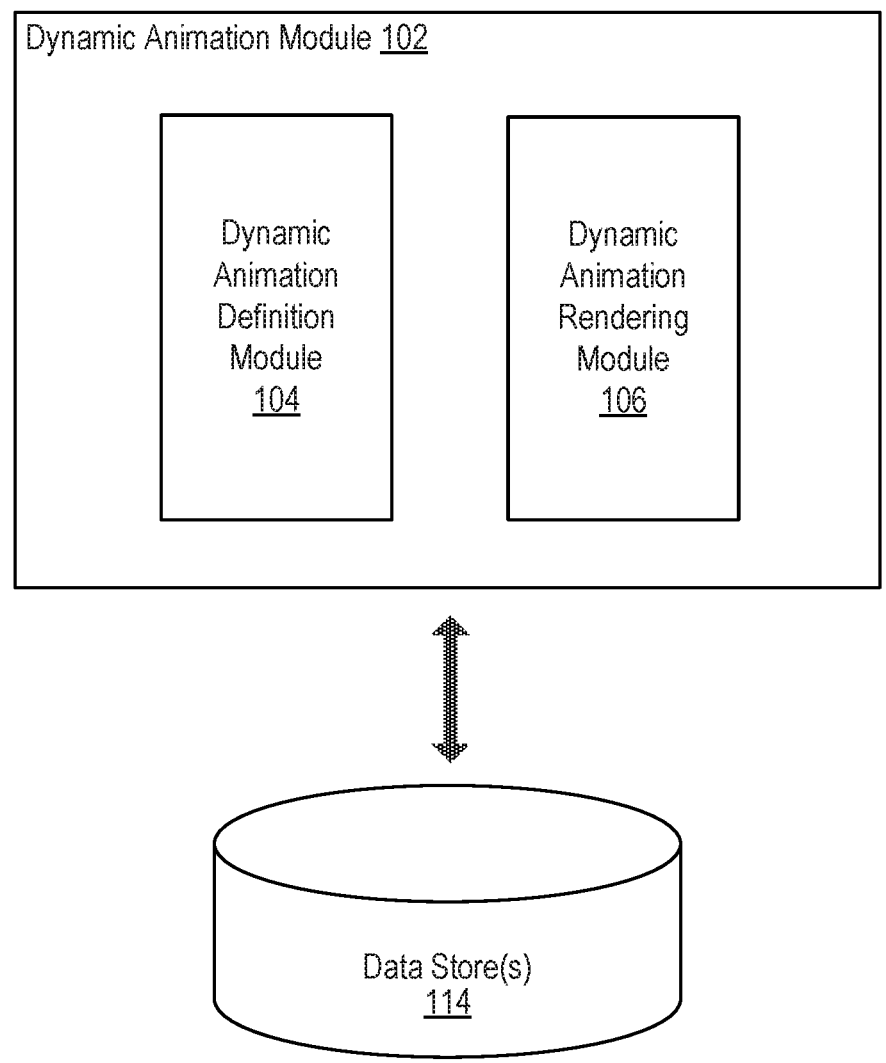
FIG. 1 illustrates an example system including a dynamic animation module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Dynamic Digital Animation

People often utilize computing devices (or systems) for a wide variety of purposes. Users can use their computing devices to, for example, interact with one another, access content, share content, and create content. In some cases, content items can include postings from members of a social networking system. Content items may include media content items, such as images or videos. Content items may be published to the social networking system or any other content platform for consumption by others. In certain instances, users may utilize computing applications on their computing devices to carry out such tasks.

Computing applications may be developed and distributed to users by application developers. For example, a social networking system may develop and distribute an application that allows users to retrieve, view, and interact with content on the social networking system. Many computing applications include one or more animations to make use of the computing application more visually interesting. Under conventional approaches, an animator will typically create an animation, and an engineer can incorporate the animation into a computing application. Under conventional approaches, once an animation has been generated by an animator, the animation is typically fixed, and cannot be changed without creating a new animation. In other words, the final animation created by an animator defines precisely what will be seen within a computing application. Such approaches can have significant drawbacks. For example, consider an example scenario in which an application developer would like to include a first animation for a first sports team using the first team's team colors, and a second animation for a second sports team using the second team's team colors. Even if the two animations are exactly alike in all other respects, the use of different colors would necessitate creation of two distinct animations, and incorporation of those two animations into the computing application. If you then consider a scenario in which there are not only two teams, but sixty-four teams, or even hundreds of teams, it can be appreciated that conventional approaches can be extremely limiting. Conventional approaches can undesirably limit the complexity and diversity of animations that can be generated for computing applications, as any minor variation in an animation may require generating and storing an independent animation. Conventional approaches may not be effective in addressing these and other problems arising in computer technology.

An improved approach rooted in computer technology overcomes the foregoing and other disadvantages associated with conventional approaches specifically arising in the realm of computer technology. In general, the presently disclosed technology can provide animators and application developers with tools to define one or more dynamic properties in an animation. Dynamic properties may be modified and/or defined using passed-in values at runtime. As such, the presently disclosed technology allows animators to define a single animation, from which multiple variations can be generated at runtime by varying values that are passed in for the dynamic properties. More details relating to the disclosed technology are provided below.

FIG. 1 illustrates an example system 100 including a dynamic animation module 102, according to an embodiment of the present technology. The dynamic animation module 102 can be configured to generate and render dynamic animations which include one or more dynamic properties that may be modified and/or defined at runtime. As shown in the example of FIG. 1, the dynamic animation module 102 can include a dynamic animation definition module 104 and a dynamic animation rendering module 106. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the dynamic animation module 102 can be implemented in any suitable combinations.

In some embodiments, the dynamic animation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the dynamic animation module 102 can be, in part or in whole, implemented as software running on one or more computing devices or systems, such as on a server system or a client computing device. In some instances, the dynamic animation module 102 can be, in part or in whole, implemented within or configured to operate in conjunction with or be integrated with a social networking system (or service), such as a social networking system 630 of FIG. 6. Likewise, in some instances, the dynamic animation module 102 can be, in part or in whole, implemented within or configured to operate in conjunction with or be integrated with a client computing device, such as the user device 610 of FIG. 6. For example, the dynamic animation module 102 can be implemented as or within a dedicated application (e.g., app), a program, or an applet running on a user computing device or client computing system. The application incorporating or implementing instructions for performing functionality of the dynamic animation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The dynamic animation module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the dynamic animation module 102. For example, the data store 114 can store files pertaining to one or more dynamic animations. It is contemplated that there can be many variations or other possibilities.

Figure 2A:
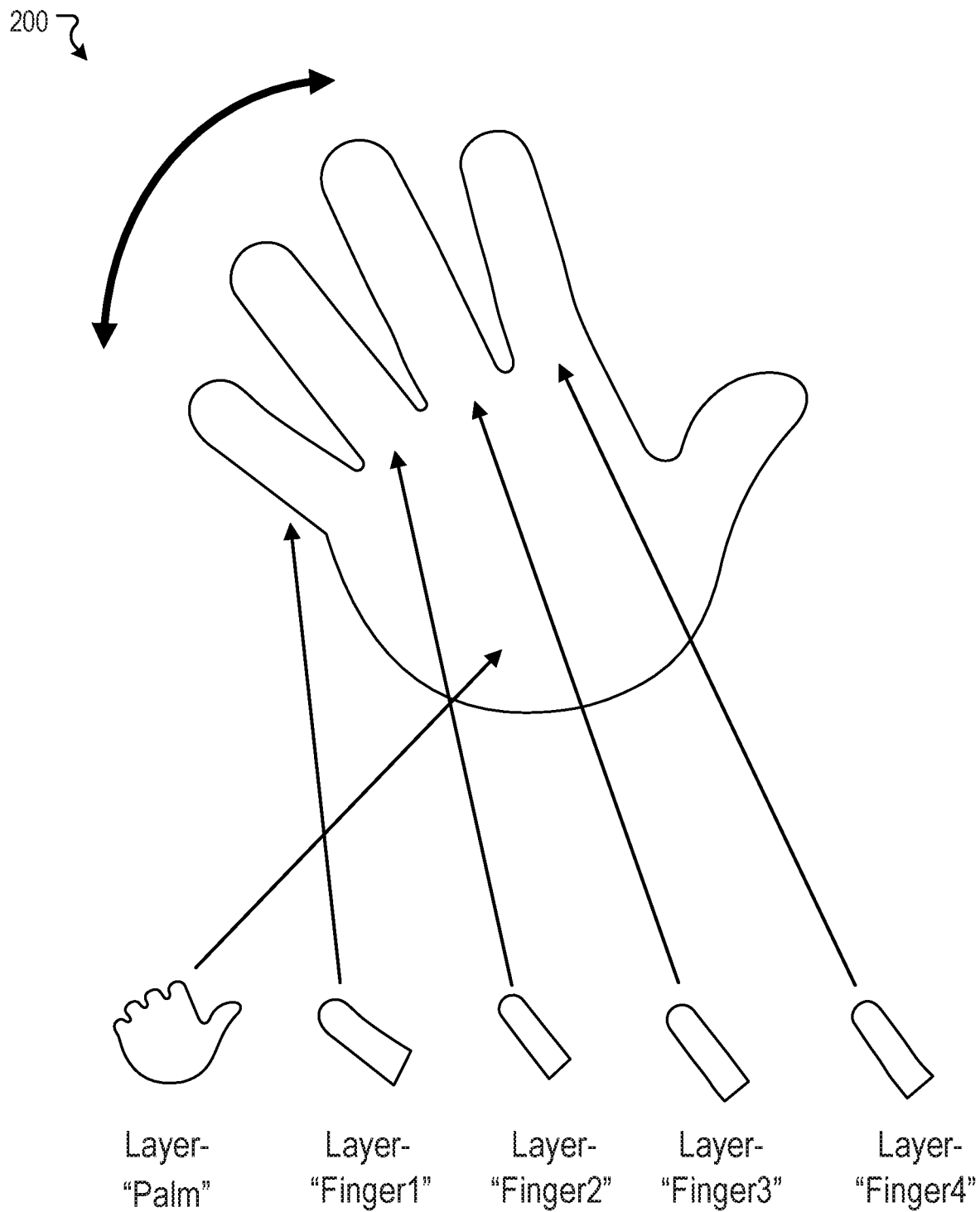
FIG. 2A illustrates an example scenario associated with defining an animation, according to an embodiment of the present technology.

The dynamic animation definition module 104 can be configured to generate a dynamic animation that can, for example, be incorporated in and/or implemented in a computing application. In an embodiment, a dynamic animation may be an animation that includes one or more dynamic properties that are not fixed, and can be modified and/or defined at runtime. In order to demonstrate various features of the presently disclosed technology, FIG. 2A illustrates an example animation 200. The example animation 200 is an animation of a hand waving. An animation will typically include one or more layers, with each layer defining a portion of the animation. Each layer comprises a plurality of layer properties that define the appearance and movement of the layer. These layer properties may include, for example, shape, position (e.g., x position, y position), rotation, scale, path, opacity, fill color, stroke color, stroke width, stroke line cap, gradient, stroke line join, miter limit, progress offset, clipping path, image, etc. The various layers in an animation are overlaid on top of one another, and are animated independently according to their respective layer properties. The aggregate effect is a single cohesive animation. In the example hand waving animation 200 of FIG. 2A, there are at least five layers: (1) a "palm" layer; (2) a "Finger1" layer; (3) a "Finger2" layer; (4) a "Finger3" layer; and (5) a "Finger4" layer. As discussed, each of these layers has layer properties which define the layer. The layers are overlaid on top of one another, and are animated independently to create the overall effect of a hand waving.

Under conventional approaches, in order to modify the animation, a user (e.g., an animator) would have to change the layer properties of the individual layers. For example, in the example animation 200, a user may wish to change the color of the hand from blue to purple. In order to do this, an animator would have to, for example, change the "fill color" property of each of the five layers from blue to purple, and then generate a new animation file with the new layer properties. In contrast, the presently disclosed technology allows an animator to define a "dynamic property" that can be dynamically defined at runtime so that various layer properties can be defined at runtime without generating a new animation. For example, in the example discussed above, an animator can define a "handColor" dynamic property. The handColor dynamic property can be mapped to various layer properties in each of the layers (e.g., the "fill color" property of each of the five layers). At runtime (e.g., after an animation has been generated and incorporated into a computing application, and immediately prior to rendering of the animation within the computing application), a value (i.e., a property value) can be received for each dynamic property in an animation. The received property value for a dynamic property can be applied to each layer property associated with and/or mapped to the dynamic property. In the example animation 200, the property value "blue" can be automatically applied to the "fill color" property in each of the five layers so that the animation will show a waving hand in the specified color. In this way, a single animation can be generated and incorporated into a computing application, but many variations of the animation can be executed by passing in different values for dynamic properties at runtime. While the example of colors has been used in this example, it should be appreciated that any layer property may be defined based on a dynamic property value received and/or determined at runtime.

The dynamic animation definition module 104 can receive animation information associated with an animation. The animation can comprise one or more layers, and each layer can comprise one or more layer properties. The dynamic animation definition module 104 can be configured to map one or more layer properties in an animation to a dynamic property. As discussed above, an animation may comprise one or more layers, with each layer comprising one or more layer properties. Furthermore, a dynamic property may be a property that can be defined at runtime. A dynamic property may be defined at runtime based on a property value that is received or determined at runtime. In certain embodiments, the dynamic animation definition module 104 can be configured to map one or more layer properties to a dynamic property based on user input received via a user interface. For example, an animator may be provided with a user interface that the animator can use to define one or more dynamic properties, and to indicate which layer properties should be mapped to each dynamic property.

In certain embodiments, a dynamic animation may include not only one or more dynamic properties that can be defined at runtime, but also one or more dynamic compositions that can be defined and/or modified at runtime. A composition can comprise a plurality of layers that are grouped together to define a particular component of an animation. In certain instances, a composition may itself be considered its own standalone animation, but an animation may comprise multiple compositions (e.g., multiple animations within a single animation). For example, consider an example animation in which three different balloons are floating from the bottom of the screen to the top of the screen (see, e.g., FIG. 4A). Each balloon could potentially be its own animation, and may comprise multiple layers that define the appearance and movement of the balloon. For each balloon, the plurality of layers that define the balloon may be grouped together into a "composition," and the three balloon compositions may be combined into a single animation. In an embodiment, the dynamic animation module 104 may be configured to associate one or more compositions in an animation with one another to indicate that those compositions are interchangeable. For example, in the example animation in which there are three different balloons floating from the bottom of the screen to the top of the screen, the animation may include composition information for 20 different balloons. The 20 different balloon compositions may be indicated as being interchangeable with one another, such that at runtime, a computing application can select three of the 20 different balloons (randomly or deterministically) to be included in the animation at a given time. Each time the animation is run, a different grouping of balloons can be selected so that the animation appears different in each iteration. Once again, in this way, a single animation can be generated with many possible variations that may arise from the single animation based on variations that may be applied at runtime. In certain embodiments, the dynamic animation definition module 104 can be configured to associate compositions with one another based on user input received via a user interface. For example, an animator may be provided with a user interface that the animator can use to define composition groups, and to indicate which compositions in an animation belong to each composition group.

Figure 2B:
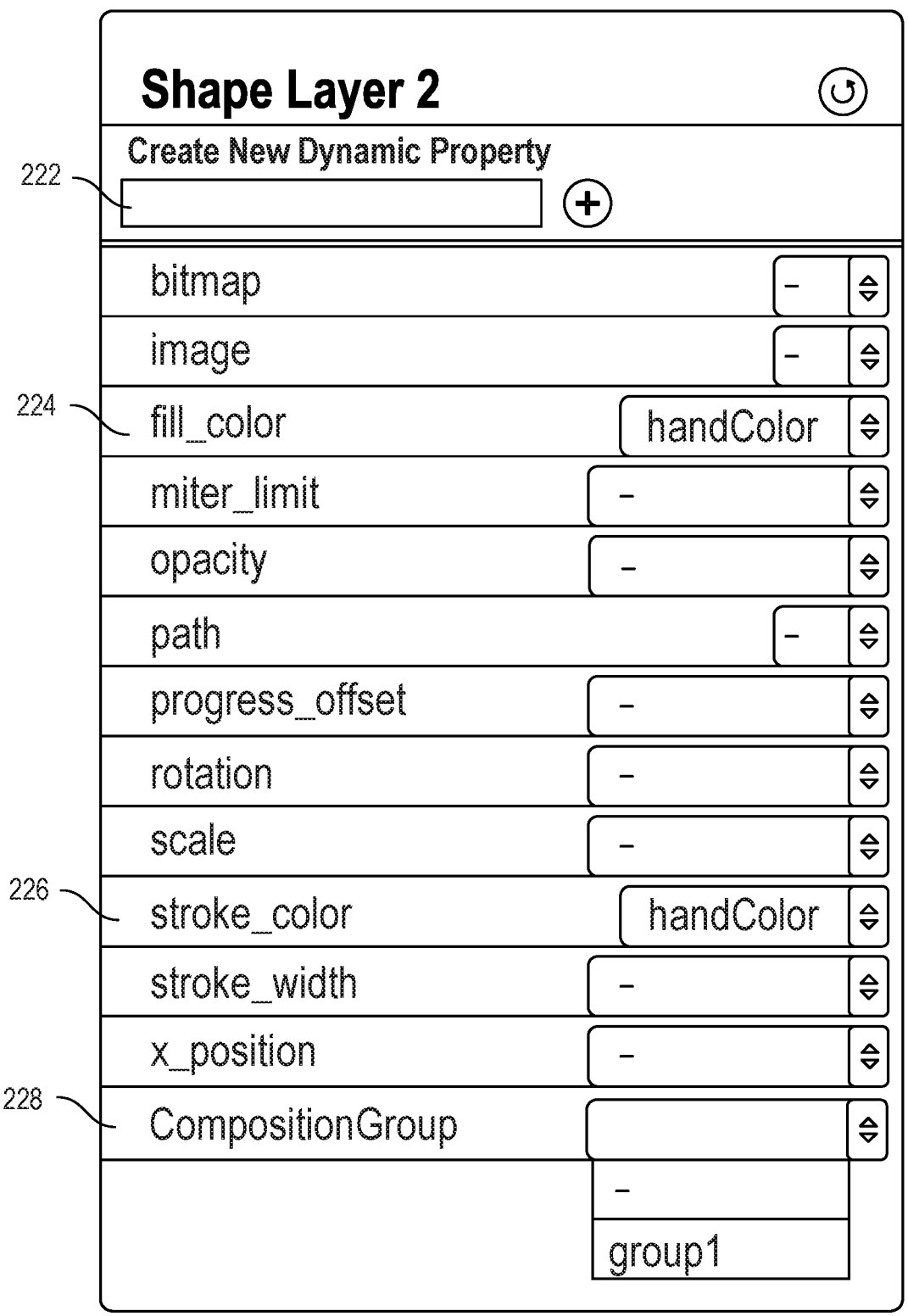
FIG. 2B illustrates an example user interface, according to an embodiment of the present technology.

FIG. 2B illustrates an example user interface 220. In the example user interface 220, an animator is presented with a set of layer properties for a layer of an animation. The layer is entitled "Shape Layer 2," and the layer properties include bitmap, image, fill_color, miter_limiter, opacity, path, etc. In other embodiments, other layer properties can be used. The animator also can define a new dynamic property using a text entry field 222. The animator can, for each layer property, use a drop-down menu to indicate whether the layer property should be mapped to a dynamic property. In the example shown in FIG. 2B, the animator has indicated that the "fill_color" layer property 224 and the "stroke_color" layer property 226 should both be mapped to the "handColor" dynamic property. Consequently, the property value that is received for the handColor dynamic property at runtime will be automatically applied to the stroke_color and fill_color layer properties for this layer. The animator can use a similar user interface to go through each layer in the animation, and map each layer property to an appropriate dynamic property (or indicate that a layer property is not mapped to any dynamic property).

Furthermore, the layer "Shape Layer 2" may belong to a particular composition in an animation. In other words, the layer may be grouped with one or more additional layers to define a composition. The user interface 220 also allows the animator to indicate whether the composition that the layer belongs to should be grouped into a composition group (228). Compositions that are identified as belonging to the same composition group may be interchangeable at runtime.

Returning to FIG. 1, when an animator has completed his or her animation, the dynamic animation definition module 104 can be configured to generate render instructions for rendering the animation. The render instructions may, for example, be stored in a FlatBuffers file or the like. In an embodiment, the dynamic animation definition module 104 can also be configured to generate code that can be incorporated into a computing application. The code generated by the dynamic animation definition module 104 may identify each dynamic property in an animation. Furthermore, the code may also cause a property value received for a dynamic property to be applied to each layer property associated with the dynamic property. The render instructions can cause the animation to be rendered based on the property values that are assigned at runtime.

The dynamic animation rendering module 106 can be configured to render a dynamic animation. As mentioned above, a computing application may comprise code associated with a dynamic animation. When the dynamic animation is to be rendered within a computing application (i.e., at runtime), the code may cause property values to be defined for each dynamic property in the dynamic animation. The computing application may also comprise and/or reference render instructions for rendering the dynamic animation. The dynamic animation rendering module 106 can render the dynamic animation based on the render instructions and the property values.

Figure 3A:
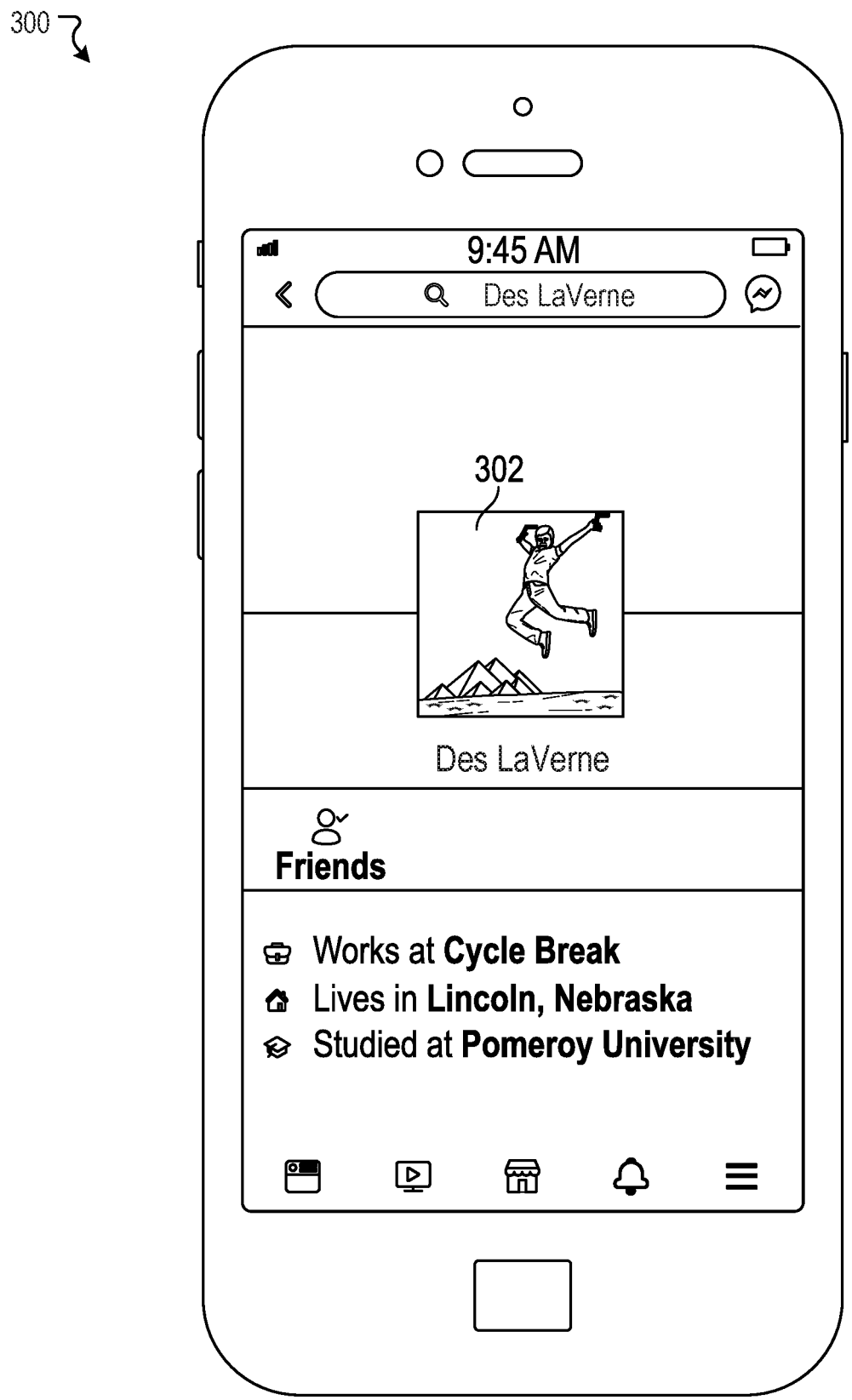
FIGS. 3A-3C illustrate an example dynamic animation, according to an embodiment of the present technology.
Figure 3B:
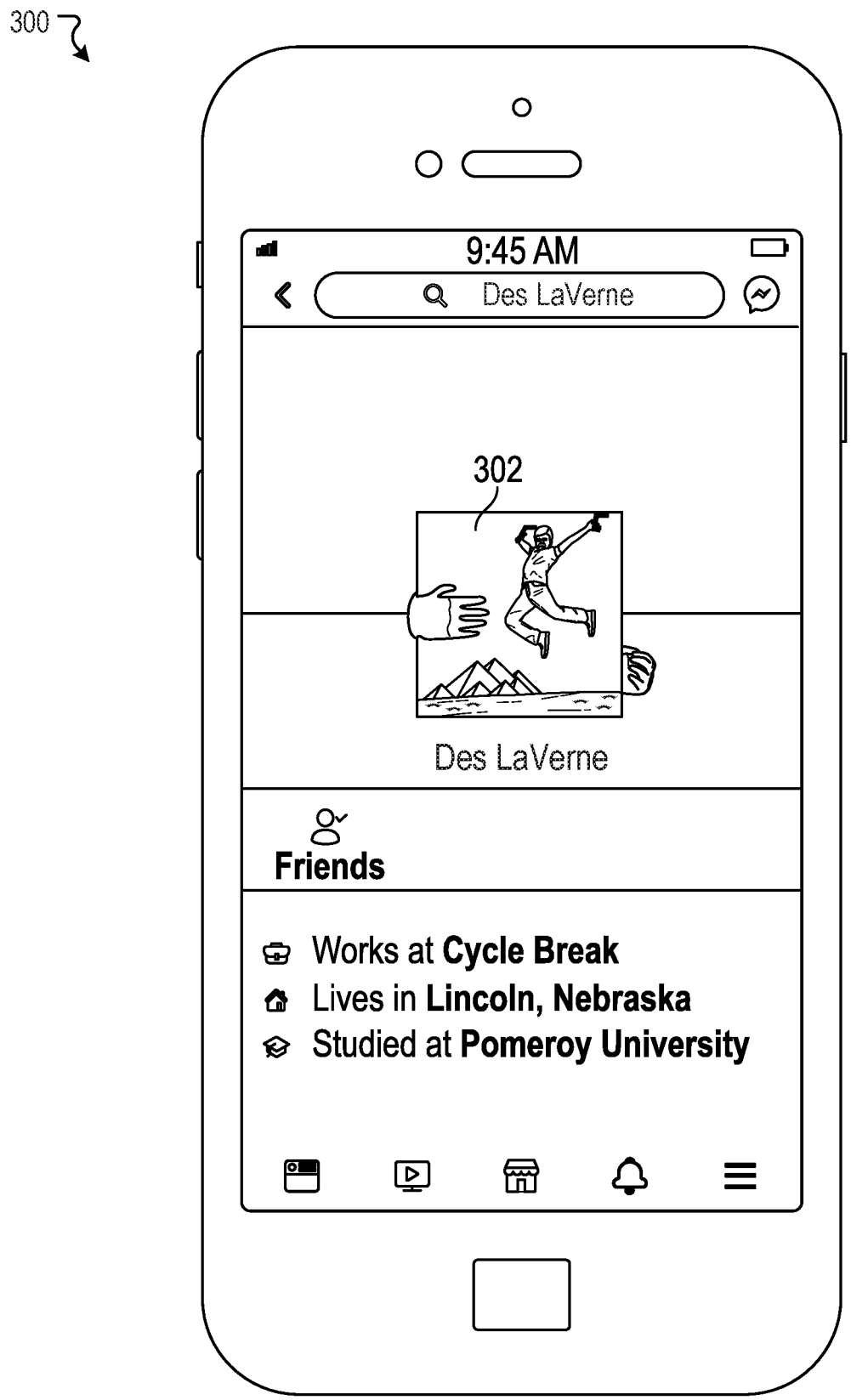
Figure 3C:
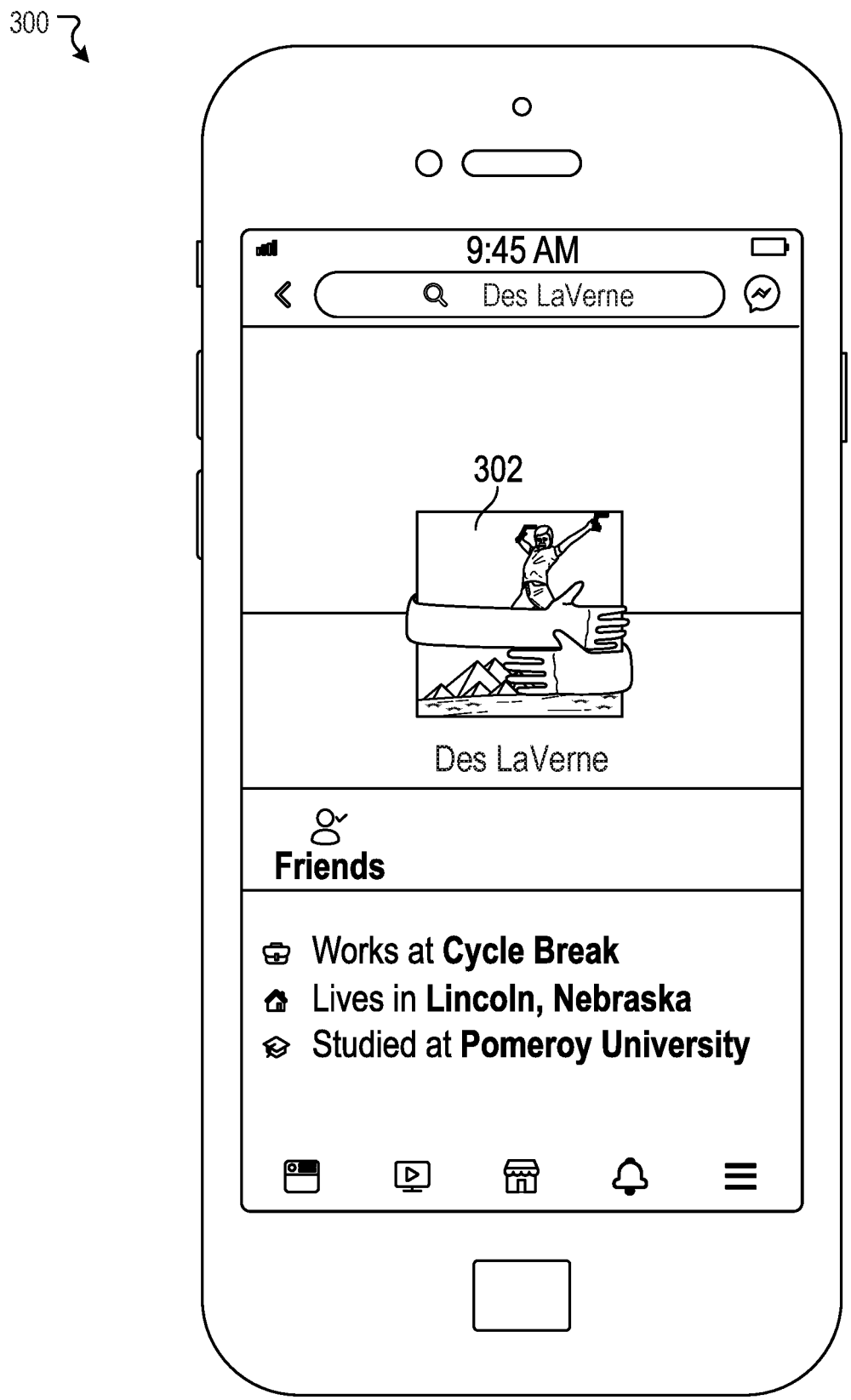

Property values for dynamic properties in an animation may be determined randomly or deterministically. In certain embodiments, dynamic property values may be automatically determined based on various criteria. For example, in one embodiment, dynamic property values may be automatically determined based on social network information associated with a user (e.g., information available on a user's social network profile). For example, consider an example animation 300 shown in FIGS. 3A-3C. The example animation 300 shows a pair of hands coming around to "hug" the profile picture 302 in a user's social network profile. Under conventional approaches, in order to create this animation, a layer may be defined which includes the image shown in the profile picture 302. However, it would be impractical to do this for every user in a social networking system, as a separate animation would have to be created for each and every profile picture on a social networking system, which could number in the millions or billions. The presently disclosed technologies address this problem by using dynamic properties. Using the currently disclosed technologies, the animation 300 can be generated with a first layer configured to depict an image. The image may be specified in a layer property associated with the first layer (i.e., an "image" layer property). However, rather than having to specify a specific image, the image layer property for the first layer may be mapped to a dynamic property to be defined at runtime. At runtime (i.e., when the "hug" animation is to be rendered on a computing device display), the dynamic animation rendering module 106 can be configured to identify or receive an identification of the profile picture that is being depicted on the display, and can pass in the profile picture (e.g., the image itself, or a URL associated with the image) as a dynamic property value. The animation can then be rendered using the displayed profile picture. The dynamic property allows for the single "hug" animation to be applied to all profile pictures on a social networking system, rather than having to generate separate animations for each and every profile picture on the social networking system.

Figure 4A:
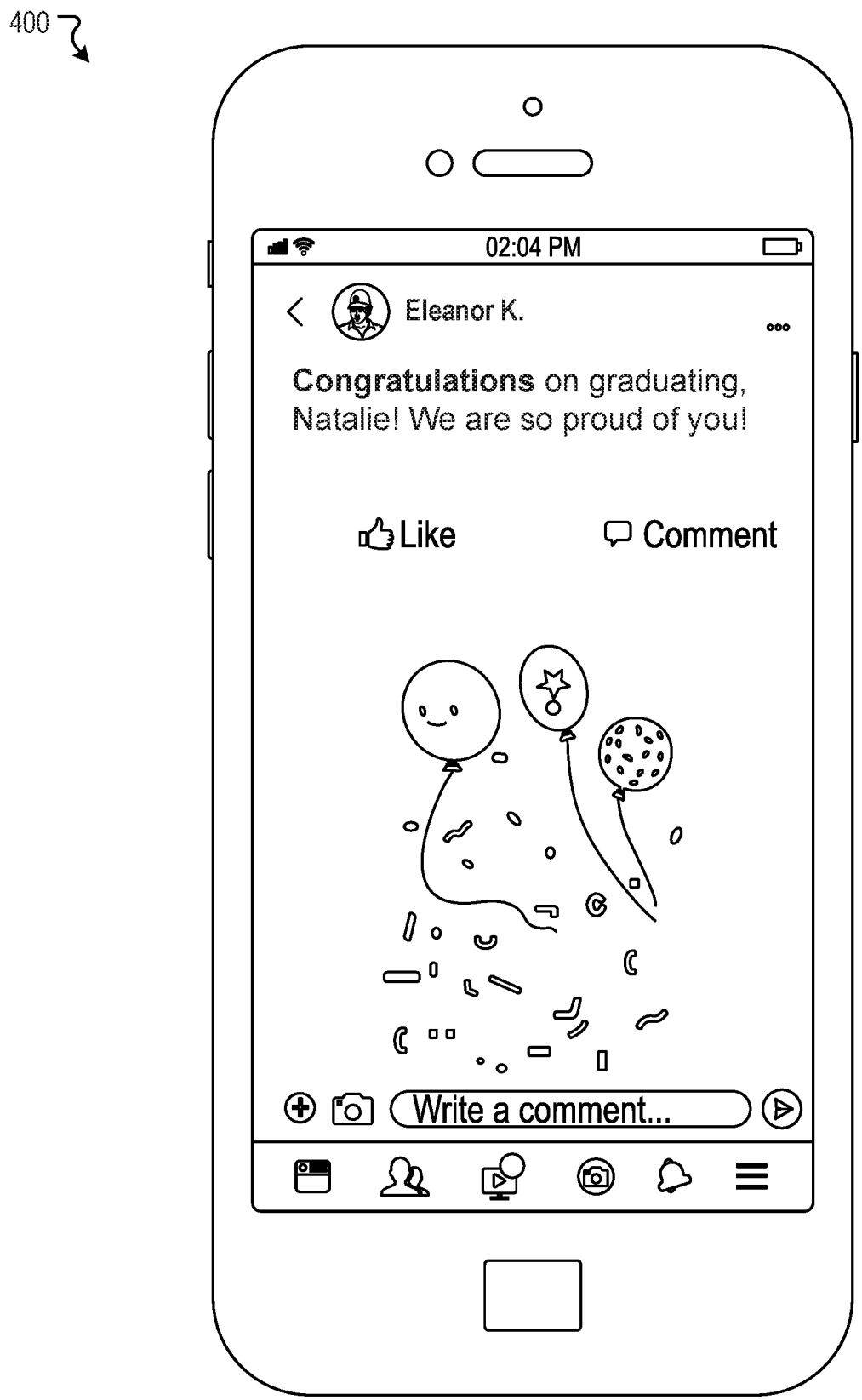
FIGS. 4A-4B illustrate an example dynamic animation, according to an embodiment of the present technology.

Another example is shown in FIG. 4A. In FIG. 4A, an animation 400 is shown in which a set of balloons and confetti fly across the screen in response to a "congratulations" message to a user. The congratulations message indicates that a first user, Eleanor K., is congratulating a second user, Natalie, on graduating from school. In an embodiment, the dynamic animation rendering module 106 may, based on social network information associated with the user "Natalie," identify the school that Natalie is graduating from, and determine school colors for that school. The school colors can then be passed as dynamic property values for the balloon and confetti animation so that the balloons and confetti are colored according to the school colors. If the congratulatory message had been posted to another user attending a different school, the different school's school colors could be passed to the animation as dynamic property values so that the balloons and confetti would be colored accordingly. In this way, a single animation can be used to create different variations of the animation that are tailored to particular users. Another possible scenario may include identifying a logo for Natalie's school, and applying the logo to one of the balloons in the animation (e.g., by passing the logo image to the animation as a dynamic property value so that the logo image can be applied to a layer in the animation at runtime). Many variations are possible.

Figure 4B:
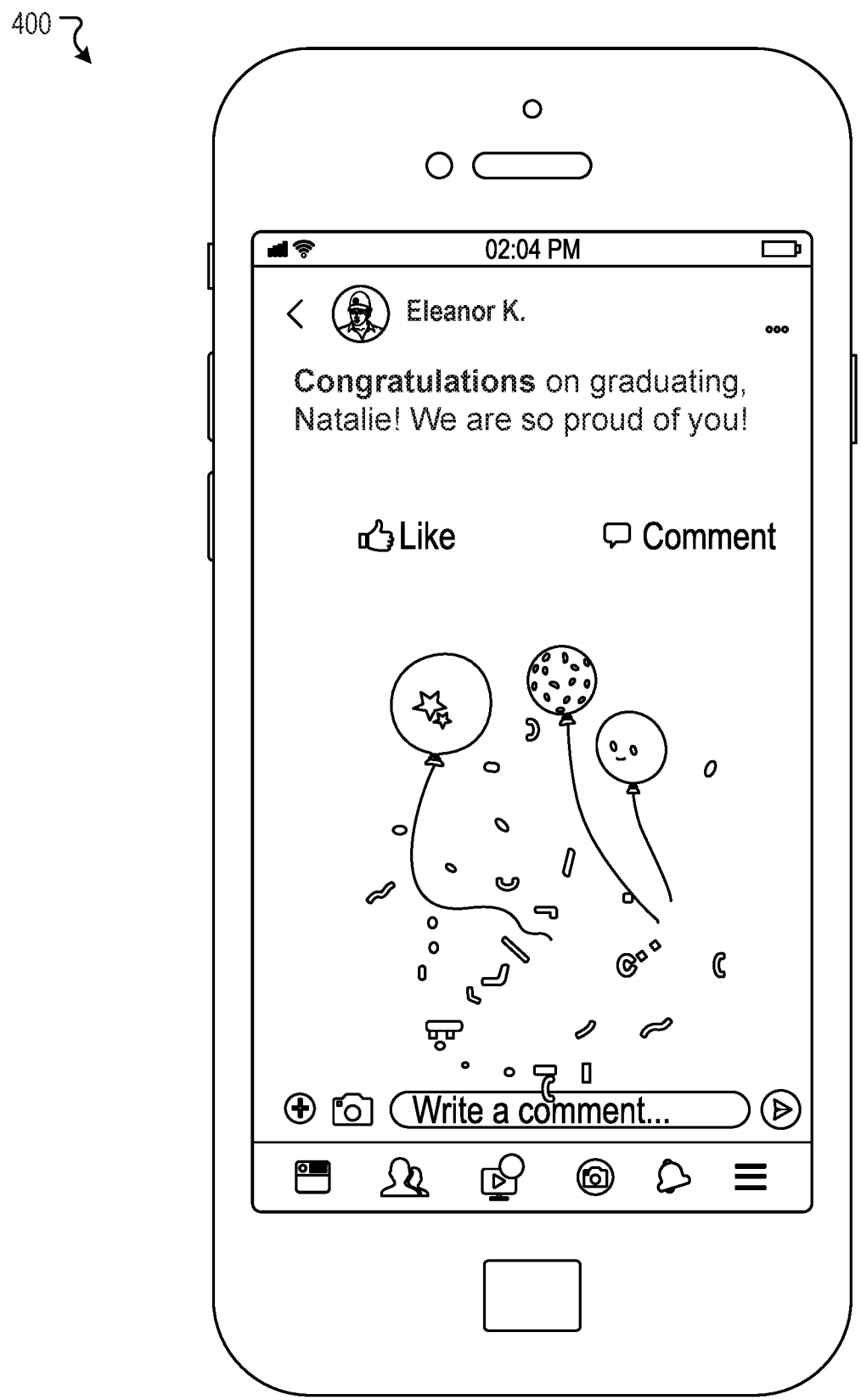

FIGS. 4A and 4B also demonstrate the ability to replace compositions in an animation with different compositions. As discussed above, when an animation is being created by an animator, the animator may create multiple compositions, and may group them together into composition groups such that compositions in a composition group can be interchangeable with one another. In the example animation 400, an animator may create many different balloon compositions (e.g., forty individual balloon compositions). The forty different compositions may be grouped together into a composition group to indicate that the balloons may be interchangeable. At runtime, the dynamic animation rendering module 106 can select a subset of three balloons from the forty balloon compositions to be used in each particular instance of the animation. In FIG. 4A, a first set of balloons has been used in the animation, while in FIG. 4B, a different set of balloons has been used. While various example use cases have been demonstrated herein, it should be understood that the present technology is not limited to these use cases. Many variations are possible.

FIG. 5A illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive animation information associated with an animation to be rendered on a computing device, wherein the animation comprises a plurality of layers and each layer comprises one or more layer properties. At block 504, the example method 500 can receive a first dynamic property, wherein the first dynamic property is configured to be defined at runtime prior to rendering of the animation. At block 506, the example method 500 can map a first set of layer properties of the one or more layer properties to the first dynamic property. At block 508, the example method 500 can generate render instructions for rendering the animation based on the animation information, the first dynamic property, and the mapping the first set of layer properties to the first dynamic property.

FIG. 5B illustrates an example method 520, according to an embodiment of the present technology. It should be appreciated that there can be additional, fewer, or alternative steps performed in similar or alternative orders, or in parallel, within the scope of the various embodiments discussed herein unless otherwise stated.

At block 522, the example method 520 can receive render instructions for rendering an animation, wherein the animation comprises: a plurality of layers, each layer comprising one or more layer properties, and a first dynamic property to be defined at runtime prior to rendering the animation, wherein the first dynamic property is mapped to a first set of layer properties of the one or more layer properties. At block 524, the example method 520 can receive a first dynamic property value for the first dynamic property. At block 526, the example method 520 can define the first set of layer properties based on the first dynamic property value. At block 528, the example method 520 can render the animation on a computing device based on the render instructions and the first dynamic property value.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
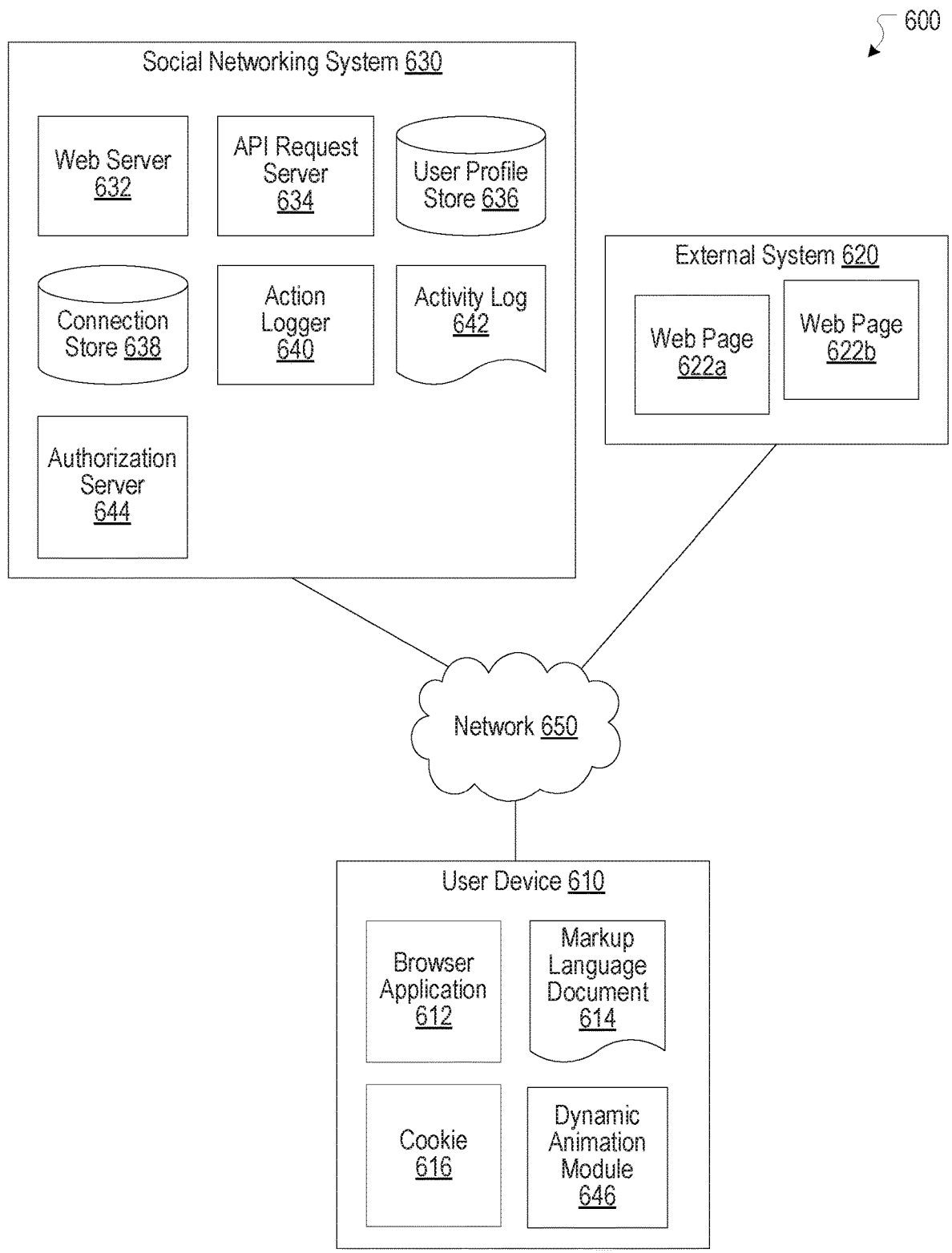
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a dynamic animation module 646. The dynamic animation module 646 can, for example, be implemented as the dynamic animation module 102, as discussed in more detail herein. As discussed previously, it should be appreciated that there can be many variations or other possibilities. For example, in some embodiments, one or more functionalities of the dynamic animation module 646 can be implemented in the social networking system 630. As discussed previously, it should be appreciated that there can be many variations or other possibilities.

Hardware Implementation

Figure 7:
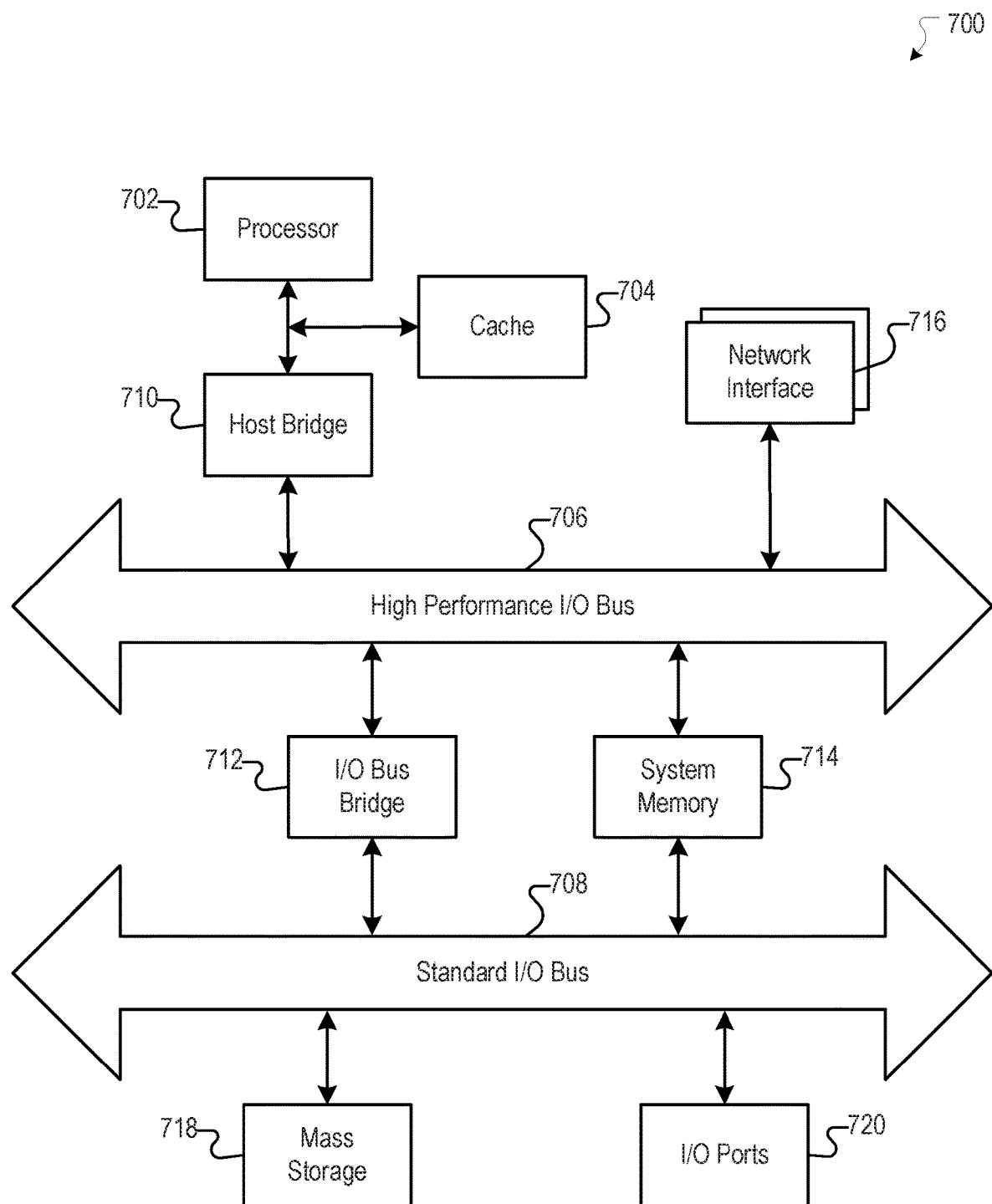
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, render instructions for rendering variations of an animation, wherein the animation comprises a plurality of layers, each layer defining a portion of a frame in the animation and comprising one or more layer properties;
   receiving, by the computing system, a first dynamic property value for a first dynamic property based on first information associated with a first user for whom a first variation of the animation is to be rendered, wherein receiving the first dynamic property value comprises randomly determining the first dynamic property value;
   receiving, by the computing system, a second dynamic property value for the first dynamic property based on second information associated with a second user for whom a second variation of the animation is to be rendered, wherein the first dynamic property value and the second dynamic property value are received after the animation is generated and prior to rendering the variations of the animation;
   applying, by the computing system, for each layer of the plurality of layers, the first dynamic property value to a first set of layer properties of the layer to render the first variation of the animation and the second dynamic property value to the first set of layer properties of the layer to render the second variation of the animation; and
   causing, by the computing system, the first variation of the animation to be rendered for the first user and the second variation of the animation to be rendered for the second user, wherein each layer of the plurality of layers is rendered independently for the first user and the second user based on the first set of layer properties.

2. The computer-implemented method of claim 1, wherein receiving the first dynamic property value comprises retrieving the information associated with the first user, and determining the first dynamic property value based on the information associated with the first user.

3. The computer-implemented method of claim 2, wherein the first dynamic property is a dynamic color property, and the determining the first dynamic property value comprises determining a first color value based on the information associated with the first user.

4. The computer-implemented method of claim 2, wherein the first dynamic property is an image property, and the determining the first dynamic property value comprises determining an image value based on the information associated with the first user.

5. The computer-implemented method of claim 4, wherein the image value defines an image to be used in the animation.

6. The computer-implemented method of claim 1, wherein the animation further comprises a first dynamic composition, and further wherein the first dynamic composition is associated with a plurality of interchangeable compositions.

7. The computer-implemented method of claim 6, wherein each composition of the plurality of interchangeable compositions comprises a plurality of layers, and each layer of the plurality of layers comprises one or more layer properties defining the layer.

8. The computer-implemented method of claim 6, further comprising identifying a first composition of the plurality of interchangeable compositions, wherein each layer of the plurality of layers is rendered on the computing device based on the identifying the first composition.

9. The computer-implemented method of claim 8, wherein identifying the first composition of the plurality of interchangeable compositions comprises randomly selecting a first composition of the plurality of interchangeable compositions.

10. A system comprising:
    at least one processor; and
    a memory storing instructions that, when executed by the at least one processor, cause the system to perform a method comprising:
      receiving render instructions for rendering variations of an animation, wherein the animation comprises a plurality of layers, each layer defining a portion of a frame in the animation and comprising one or more layer properties;
      receiving a first dynamic property value for a first dynamic property based on first information associated with a first user for whom a first variation of the animation is to be rendered, wherein receiving the first dynamic property value comprises randomly determining the first dynamic property value;
      receiving a second dynamic property value for the first dynamic property based on second information associated with a second user for whom a second variation of the animation is to be rendered, wherein the first dynamic property value and the second dynamic property value are received after the animation is generated and prior to rendering the variations of the animation;

applying, for each layer of the plurality of layers, the first dynamic property value to a first set of layer properties of the layer to render the first variation of the animation and the second dynamic property value to the first set of layer properties of the layer to render the second variation of the animation; and causing the first variation of the animation to be rendered for the first user and the second variation of the animation to be rendered for the second user, wherein each layer of the plurality of layers is rendered independently for the first user and the second user the first set of layer properties.

11. The system of claim 10, wherein receiving the first dynamic property value comprises retrieving the information associated with the first user, and determining the first dynamic property value based on the information associated with the first user.

12. The system of claim 11, wherein first dynamic property is a dynamic color property, and the determining the first dynamic property value comprises determining a first color value based on the information associated with the first user.

13. The system of claim 11, wherein the first dynamic property is an image property, and the determining the first dynamic property value comprises determining an image value based on the information associated with the first user.

14. The system of claim 13, wherein the image value defines an image to be used in the animation.

15. A non-transitory computer-readable storage medium including instructions that, when executed by at least one processor of a computing system, cause the computing system to perform a method comprising:
receiving render instructions for rendering variations of an animation, wherein the animation comprises a plurality of layers, each layer defining a portion of a frame in the animation and comprising one or more layer properties;

receiving a first dynamic property value for a first dynamic property based on first information associated with a first user for whom a first variation of the animation is to be rendered, wherein receiving the first dynamic property value comprises randomly determining the first dynamic property value;

receiving a second dynamic property value for the first dynamic property based on second information associated with a second user for whom a second variation of the animation is to be rendered, wherein the first dynamic property value and the second dynamic property value are received after the animation is generated and prior to rendering the variations of the animation;

applying, for each layer of the plurality of layers, the first dynamic property value to a first set of layer properties of the layer to render the first variation of the animation and the second dynamic property value to the first set of layer properties of the layer to render the second variation of the animation; and causing the first variation of the animation to be rendered for the first user and the second variation of the animation to be rendered for the second user, wherein each layer of the plurality of layers is rendered independently for the first user and the second user based on the first set of layer properties.

16. The non-transitory computer-readable storage medium of claim 15, wherein receiving the first dynamic property value comprises retrieving the information associated with the first user, and determining the first dynamic property value based on the information associated with the first user.

17. The non-transitory computer-readable storage medium of claim 16, wherein first dynamic property is a dynamic color property, and the determining the first dynamic property value comprises determining a first color value based on the information associated with the first user.

18. The non-transitory computer-readable storage medium of claim 16, wherein the first dynamic property is an image property, and the determining the first dynamic property value comprises determining an image value based on the information associated with the first user.

19. The non-transitory computer-readable storage medium of claim 15, wherein the image value defines an image to be used in the animation.

* * * * *